(No Model.)
C. O. CASE.
KNOB ATTACHMENT.
No. 533,839. Patented Feb. 5, 1895.
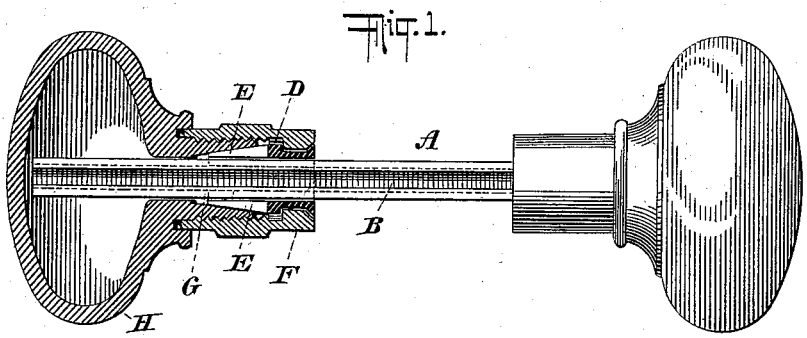
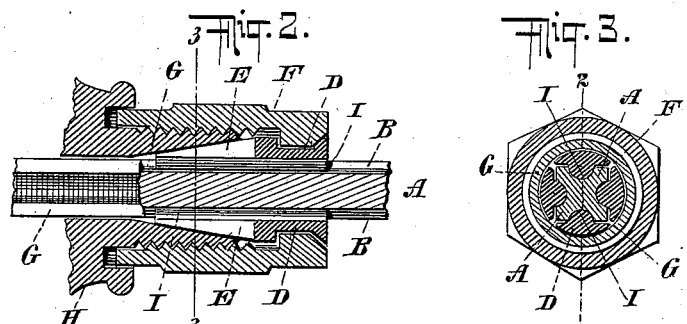
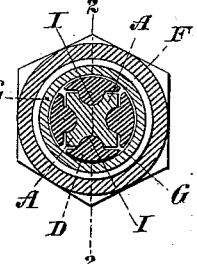
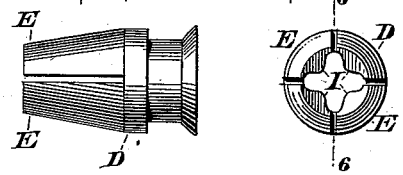
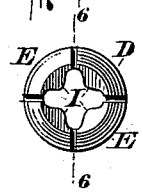
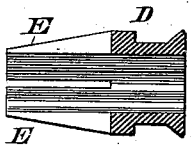
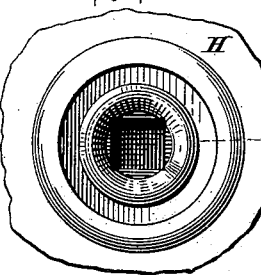
WITNESSES:
Gustave Dieterich
Edward Olmsted
INVENTOR
Cromwell O. Case.
BY
R. C. Mitchell.
ATTORNEY.

UNITED STATES PATENT OFFICE.

CROMWELL O. CASE, OF NEW BRITAIN, CONNECTICUT, ASSIGNOR TO P. & F. CORBIN, OF SAME PLACE.

KNOB ATTACHMENT.

SPECIFICATION forming part of Letters Patent No. 533,839, dated February 5, 1895.

Application filed July 25, 1894. Serial No. 518,521. (No model.)

*To all whom it may concern:*

Be it known that I, CROMWELL O. CASE, a resident of New Britain, in the county of Hartford and State of Connecticut, have invented certain new and useful Improvements in Door-Knobs, of which the following is a full, clear, and exact specification.

My invention relates to an improved door knob and consists in providing therein a means whereby it may be quickly and securely attached to a spindle.

The objects of my invention are mainly; to provide in a door knob a novel means for attaching the same to the knob spindle for the purpose of obviating the necessity of using a set-screw, which projects through a perforation necessarily made in the shank of the knob, and which oftentimes rusts to the spindle so that it is very difficult to remove the knob, and furthermore to provide a means which shall facilitate the longitudinal adjustment of the knob on the spindle.

My invention is illustrated by the accompanying drawings, in which—

Figure 1 is a side elevation of my invention partly in longitudinal section. Fig. 2 is an enlarged longitudinal section of the operative parts as shown in Fig. 1 on line 2—2 Fig. 3. Fig. 3 is a cross-section on the plane of the line 3—3 Fig. 2. Fig. 4 is a side elevation of the tapered sleeve, one of the details of the mechanism. Fig. 5 is an end view of the detail shown in Fig. 4. Fig. 6 is a section on the plane of the line 6—6 Fig. 5. Fig. 7 is an end view of the door-knob looking into the spindle perforation therein.

A is a knob-spindle. By preference this spindle is provided in each side with longitudinal channel B. These channels are by preference knurled as shown. D is a sleeve adapted to loosely slide over the said spindle. One end of the sleeve may be tapered as shown. Longitudinal slots are formed in the tapered end of the sleeve to form yielding ends or jaws E E.

F is a thimble adapted to screw over the shank G of the knob H. The inner surface of the knob shank G is tapered to a degree corresponding substantially to the taper of the sleeve D. The sleeve D is loosely carried in the thimble F and although free to turn, it cannot be moved longitudinally therein. The means shown in the accompanying drawings to hold the sleeve in the thimble, consists merely in an annular ring extending from the thimble, turning in a corresponding annular groove in the sleeve.

I I are bosses formed on the inner side of the jaws E E, but which preferably extend throughout the length of the sleeve. These bosses I I may be knurled or roughened if desirable, and are adapted to move in the line of the channels B B. The bosses I I are of greater depth than the depth of the channels into which they are adapted to project, for the purpose of preventing that portion of each jaw adjacent to each boss, from operatively contacting with the upper surface of the spindle, so that the only points of operative contact between the spindle and the sleeve are in the channels.

In operation the thimble F is loosely screwed on to the knob shank G. The knob is then slipped on to the spindle to the desired position. By turning the thimble F so that it advances on to the shank G, the jaws E E advance into the tapered inner side of the shank G until they are drawn toward each other by action of the taper so as to cause the bosses to tightly pinch the spindle A in the channels B, B, thereby securely holding the knob thereon.

The outer surface of the thimble may be formed to facilitate its being turned by hand or by a tool, as desired.

It is obvious that it is not absolutely essential that the sleeve D should taper for if the jaws E E are sufficiently small to enter the tapered opening in the knob shank, the said tapered opening in the shank would be sufficient to draw the bosses I I on the jaws into the channels B, B. As shown in Fig. 7, the rear of the opening in the knob shank G is of rectangular form, by preference, so that the spindle may not turn therein, thereby partially relieving the sleeve D of the necessity of performing that function.

The particular advantages afforded by this invention are as follows: The knob may be easily and quickly attached or detached by simply turning the thimble F in one direction or the other. Its position upon the spindle may be adjusted to a minimum. It cannot rattle because it grips the spindle from four sides in the channels B B and it does not require that the spindle shall be weakened by the presence of one or more screw holes.

It will be seen that a very important element of my invention is the spindle provided with the channels in the sides thereof, into which the bosses tightly press when the parts are assembled.

Having thus described my invention, what I claim, and desire to secure by Letters Patent, is—

1. An attaching device for door-knobs consisting of a longitudinally channeled spindle, a sleeve carried by the knob, yielding jaws projecting from said sleeve, longitudinal bosses formed on the inner surfaces of said jaws, said bosses being of greater depth than the depth of the adjacent channels in the spindle, with means as described for forcing said jaws toward the spindle to cause the bosses to contact with the spindle in the channels.

2. A door knob attaching device consisting of a spindle A, having a rounded knurled channel in each of its sides, a sleeve B having tapered yielding jaws E E from the inner faces of which project longitudinal knurled bosses I I, each of said bosses being deeper than the depth of its adjacent channel in the spindle, said sleeve B being loosely carried by a thimble adjustably secured on the knob shank, the tapered jaws on said sleeve entering a tapered opening in the knob shank, substantially as and for the purpose specified.

CROMWELL O. CASE.

Witnesses:
  C. A. BLAIR,
  G. E. ROOT.